United States Patent
Kulhalli et al.

(10) Patent No.: US 6,694,063 B2
(45) Date of Patent: Feb. 17, 2004

(54) OFFSET CORRECTION OF THE OUTPUT OF A CHARGE COUPLED DEVICE

(75) Inventors: Suhas R. Kulhalli, Bangalore (IN); Supriyo Palit, Bangalore (IN); Sindhuja Sridharan, Sunnyvale, CA (US); Shakti Shankar Rath, Bhubaneswar (IN); Anand Hariraj Udupa, Chennai (IN)

(73) Assignee: Texas Instruments Incorporated, Dallas, TX (US)

( * ) Notice: Subject to any disclaimer, the term of this patent is extended or adjusted under 35 U.S.C. 154(b) by 634 days.

(21) Appl. No.: 09/747,325

(22) Filed: Dec. 21, 2000

(65) Prior Publication Data

US 2002/0080406 A1 Jun. 27, 2002

(51) Int. Cl.$^7$ ................................................ G06K 9/40
(52) U.S. Cl. ........................ 382/275; 358/483; 358/514; 348/157; 348/264
(58) Field of Search ............................... 382/100, 257; 358/401, 442, 483, 484, 494, 513, 514; 348/246, 254, 294, 295, 302, 303, 311, 312, 324

(56) References Cited

U.S. PATENT DOCUMENTS

| | | | | |
|---|---|---|---|---|
| 5,008,739 A | * | 4/1991 | D'Luna et al. | 348/246 |
| 5,761,480 A | * | 6/1998 | Fukada et al. | 345/501 |
| 6,344,906 B1 | * | 2/2002 | Gatto et al. | 358/443 |
| 6,542,183 B1 | * | 4/2003 | DeAngelis et al. | 348/157 |

* cited by examiner

Primary Examiner—Jayanti K. Patel
Assistant Examiner—Abolfazl Tabatabai
(74) Attorney, Agent, or Firm—J. Dennis Moore; W. James Brady, III; Frederick J. Telecky, Jr.

(57) ABSTRACT

An offset is used to correct the output of a charge coupled device (CCD). The correction to the offset is determined by an exponential curve which allows for greater correction when error is large, and little correction when the error is small. The exponential curve may be viewed as a sequence of connected linear segments, and the correction to the offset may be determined by the slope of the segment to which the error maps. As the slopes at large errors are steep, the slope is correspondingly high, and the offset converges towards the correct value quickly. Power consumption is optimized by implementing the offset generation circuit using capacitor charge sharing principles.

18 Claims, 5 Drawing Sheets

| N | $V_{out}$ |
|---|---|
| 0 | 280 |
| 90 | 103.0062 |
| 180 | 37.8939 |
| 270 | 13.9404 |
| 360 | 5.1284 |
| 450 | 1.8866 |
| 540 | 0.6941 |
| 630 | 0.2553 |
| 720 | 0.0939 |
| 810 | 0.0346 |
| 900 | 0.0127 |
| 990 | 0.0047 |

| ERROR RANGE (LSBs) | STEP SIZE (LSBs) |
|---|---|
| 280−103.0062 | 1.9469 |
| 103.0062−37.8939 | 0.7162 |
| 37.8939−13.9404 | 0.2635 |
| 13.9404−51.284 | 0.0969 |
| 5.1284−1.8866 | 0.0357 |
| 1.8866−0.6941 | 0.0131 |
| 0.6941−0.2553 | 0.0048 |
| 0.2553−0.0939 | 0.0018 |
| 0.0939−0.0346 | 0.0007 |
| 0.0346−0.0127 | 0.0002 |
| 0.0127−0.0047 | 0.0001 |

| STEP SIZE (LSBs) | STEP SIZE (μV) |
|---|---|
| 1.9469 | 2852 |
| 0.7162 | 1049 |
| 0.2635 | 386 |
| 0.0969 | 142 |
| 0.0357 | 52.3 |
| 0.0131 | 19.2 |
| 0.0048 | 7.03 |
| 0.0018 | 2.64 |
| 0.0007 | 1.03 |
| 0.0002 | 0.293 |
| 0.0001 | 0.146 |

| STEP SIZE (LSBs) | STEP SIZE (μV) |
|---|---|
| 1.9469 | 2852 |
| 0.7162 | 1049 |
| 0.2635 | 386 |
| 0.0969 | 142 |
| 0.0357 | 52.3 |
| 0.0131 | |
| 0.0048 | |
| 0.0018 | |
| 0.0007 | |
| 0.0002 | |
| 0.0001 | |

35

OFFSET CORRECTION OF THE OUTPUT OF A CHARGE COUPLED DEVICE

RELATED APPLICATION(S)

The present application is related to the commonly assigned co-pending U.S. patent application Ser. No. 09/703,471, entitled, "Offset Correction to The Output of a Charge Coupled Device", filed on Oct. 31, 2000, and is incorporated in its entirety herewith (hereafter "RELATED APPLICATION 1").

BACKGROUND OF THE INVENTION

1. Field of the Invention

The present invention relates to charge coupled devices (CCD) typically used to capture color pictures in digital form, and more specifically to a method and apparatus for correcting the offset applied to the output of the CCDs.

2. Related Art

Charge coupled devices (CCDs) are often used to capture images received in the form of light. A CCD typically contains several pixels, with each pixel holding an amount of charge proportionate to the intensity of incident light and the length of time the light is allowed to fall on the pixel. The charge can be later translated to a voltage level and/or digital data for further processing and/or storing (in mass non-volatile storage). CCDs thus find application in devices such as digital cameras and scanners as is well known in the relevant arts.

A correction (termed "offset correction") is often applied to the output (i.e., voltage or digital data in the above paragraph) of a CCD typically to compensate for (or eliminate) undesirable components which may be present in the CCD output. For example, the charge generated by a CCD should ideally be entirely generated by the incident light but other phenomenon such as thermally generated electrons add to the charge.

Such additions are undesirable, for example, because a later reproduced image may be brighter than that represented by the light incident on the CCD. Accordingly, it is desirable that the undesirable components be eliminated, and the corresponding correction is termed as offset correction. The extent to which a correction is applied, is referred to as an offset, and the act of applying the offset to the CCD output may be referred to as offset correction. The difference between the applied offset and the accurate offset (which would have eliminated the undesirable components entirely) may be referred as an error in the offset correction.

To facilitate the removal of such undesirable components, CCDs often include black pixels which are shielded from light when the active pixels are exposed to light. The charge in the black pixels may be deemed to represent the undesirable components to some extent, and accordingly the offset to the CCD charge is computed based on the charge present in the black pixels. The offset is thus subtracted from the CCD outputs to generate the true image (close to the image represented by the incident light).

In one approach described in RELATED APPLICATION 1 noted above, the offset to be generated is indicated using two digital to analog converters (DACs) termed as coarse DAC (CDAC) and fine DAC (FDAC) respectively. The output voltage of the CDAC is subtracted from a voltage level representing the charge output of a CCD, and the resulting signal is amplified before further correction is performed based on the output of the CDAC. By choosing two DACs (instead of a single DAC), the CCD output may be corrected to a single bit precision of an ADC (used for digitizing the CCD output voltage), while minimizing the power and space consumption.

In effect, the output of CDAC effects correction in coarse steps (due to correction prior to amplification) and the output of FDAC effects correction in fine steps. Thus, the operation of CDAC leads to fast convergence to accurate offset correction while the FDAC allows correction potentially up to a least significant bit of a analog to digital converter (ADC) later used to convert the corrected CCD output to a digital representation. The correction may be switched between coarse correction mode and fine correction mode depending on the extent of further correction determined as the black pixels of the CCD output are continually examined.

One problem with such switching between two modes of correction is that the error in correction may suddenly jump as a result of the switch. A typical reason for such a jump is that the two DACs may generate different analog offsets for the same intended offset due to the inherent non-ideal implementations. The increase in error is undesirable at least in that it may manifest as a line (or a band) in a later reproduced image. Such display artifacts are generally undesirable. Accordingly, what is needed is a method and apparatus which provide for offset correction which converges rapidly, provides for accurate correction to a desired degree, while avoiding (or minimizing) display artifacts.

SUMMARY OF THE INVENTION

According to an aspect of the present invention, the correction to be applied to a previously applied offset is determined by an exponential curve which allows for a correction proportionate to an error in the offset (i.e., greater correction when error is large, and little correction when the error is small). As the correction is more when the errors are large, the offset may converge towards a correct value quickly.

In one embodiment, a correlated double sampler (CDS) receives the charge output of a charge coupled device (CCD), and corrects the output by an offset. The voltage generated by the CCD is amplified by a gain amplifier, and the amplified voltage is digitized by an analog to digital converter (ADC). An error determination circuit determines the error in the offset by examining the output corresponding to the black pixels. A correction circuit determines the correction to be applied to the offset by mapping the error to the exponential curve, and then generates a corrected offset value based on the determined correction.

According to another aspect of the present invention, the exponential curve is viewed as a sequence of connected linear segments, and the correction to the offset may be determined by the slope of the segment to which the error maps. As the slopes at large errors are steep, the slope is correspondingly high, and the offset converges towards the correct value quickly. Thus, the error is mapped to one of the segments and the correction is determined according to the slope. In an implementation, a look-up table generates an identifier of the segment, and a digital to analog converter (DAC) generates a corresponding correction value.

One more aspect of the present invention optimizes power consumption and space requirement by implementing the offset generation circuit using charge sharing in capacitors. One embodiment of the offset generation circuit contains a first capacitor and a first transistor. The source terminal of the transistor is connected to a constant current source, and the gate terminal is connected to the first capacitor. The offset generation circuit further includes a first block containing a plurality of sets, with each set in turn containing a second capacitor. The source terminal is connected to the second capacitor by a first switch. The first capacitor and the gate terminal is connected to the second capacitor by a second switch.

The first switch is closed and the second switch is opened to cause the second capacitor to be charged by a source voltage and the first capacitor to be charged by a gate voltage. The first switch is opened and the second switch is closed to short the first and second capacitors, whereby the change in voltage across the first capacitor is given by the equation: $V_{SG}/((1+(C1/C2))$, wherein $V_{SG}$ represents the voltage across the source and gate terminals, and C1 and C2 respectively represent the capacitances of the first and second capacitors.

The capacitance of each of the second capacitors is chosen to enable different set to provide different changes, and the first and second switches corresponding to all the sets except a set designed to provide the desired change are maintained in an open position such that the desired change is attained on the first capacitor. By such a design, the voltage level on the first capacitor is continually updated as the black pixels of a CCD output are received. Thus, the voltage level on the first capacitor represents the corrected offset value.

Another feature enables the voltage on the first capacitor to be corrected positively and negatively (i.e., in both polarities). The first transistor may be implemented as an NMOS transistor. The offset generation circuit may further contain a PMOS transistor and a second block. The source terminal of the PMOS transistor also is connected to another constant current source and the gate terminal of the PMOS transistor is connected to the first capacitor.

The second block may have identical components as the first block, wherein the first and second switches of only one of the sets in both the first and second blocks is operated to be in a closed position such that the voltage level on the first capacitor is changed by one polarity if the operated set is in the first block and by another polarity if the operated set is in the second block. Thus, a decoder may cause only one of the sets to be operated depending on the sign and magnitude of the correction. As the offset generation circuit may be implemented in the form of capacitors, current sources and switches, the electrical power and space requirements may be minimized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, the extent to which an offset is to be incremented (or decremented) is determined based on an exponential curve which allows for the offset to be adjusted proportionate to the error. The curve may be designed consistent with various criteria as a designer wishes. For example, the curve may be chosen to allow a desired rate at which the CCD output is corrected.

In one embodiment described below, correction to the offset is determined by the slope of the exponential curve at a point to which the error maps. To simplify the determination of the slope, the curve is viewed as a sequence of discrete connected lines, and the correction to the offset is determined by the slope (gradient) of the specific line on which the error falls. Due to the fact that the curve has a steeper slope at points of high error, the correction to the offset (the extent to which incremented) is also large when the error is large.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
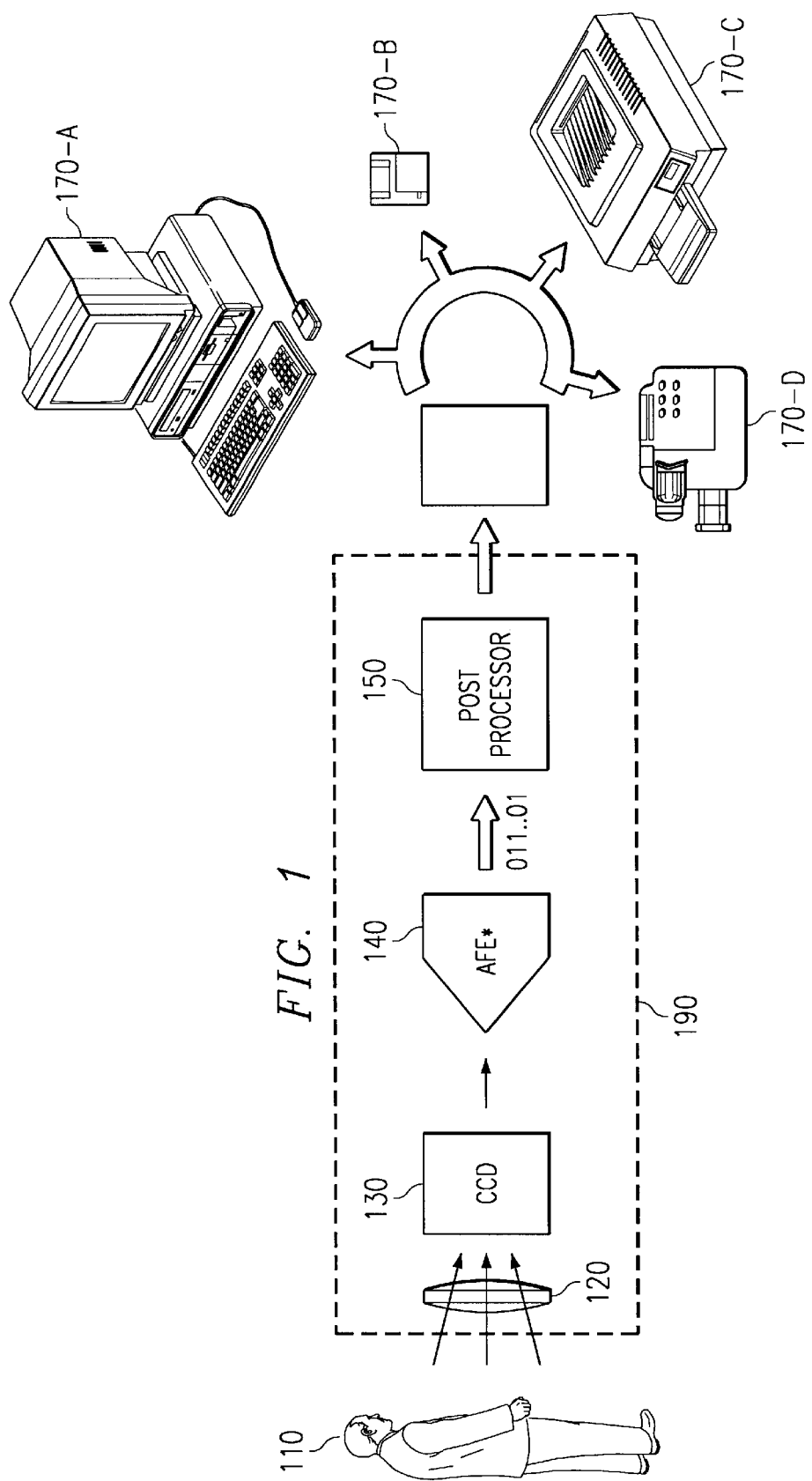
FIG. 1 is a block diagram illustrating an example environment in which the present invention can be implemented.

FIG. 1 is a block diagram illustrating an example environment in which the present invention can be implemented. There is shown the light from image 110 being allowed pass through device 190 (such as a digital camera or a scanner). The output of device can be used for further processing, printing or storing, etc., as described below in further detail.

With respect to device 190, the light from image 110 is shown being focused on CCD 130 by lens 120. CCD 130 contains several pixels which are charged proportionate to the product of the incident light intensity and the time of exposure to the light. The charge is converted into voltage in a known way and transferred to analog front-end (AFE) 140. CCD 130 is an example embodiment of an image sensor.

AFE 140 converts the received voltages into digital values, and transmits the digital values to post processor 150. AFE 140 may employ techniques such as correlated double sampling (which are well known in the relevant arts) in the course of generating the digital values. AFE 140 receives voltage values corresponding to both dark pixels and active pixels and performs offset correction in accordance with several aspects of the present invention as described below in further detail.

Post processor 150 processes the digital values received from AFE 140, generally to enhance the quality of image represented by the digital values and/or to convert the data into suitable format for storing. The resulting output data may be used in several ways, for example, viewed/edited by computer system 170-A, stored in floppy disk 170-B, printed on a printer 170-C or transferred to video player 170-D.

However, as noted in the background section above in greater detail, a robust offset correction approach may be needed to ensure that the reproduced images (e.g., in 170-A through 170-D) accurately represent image 110. An example offset correction approach implemented within AFE 140 is described below.

3. Method

Figure 2:
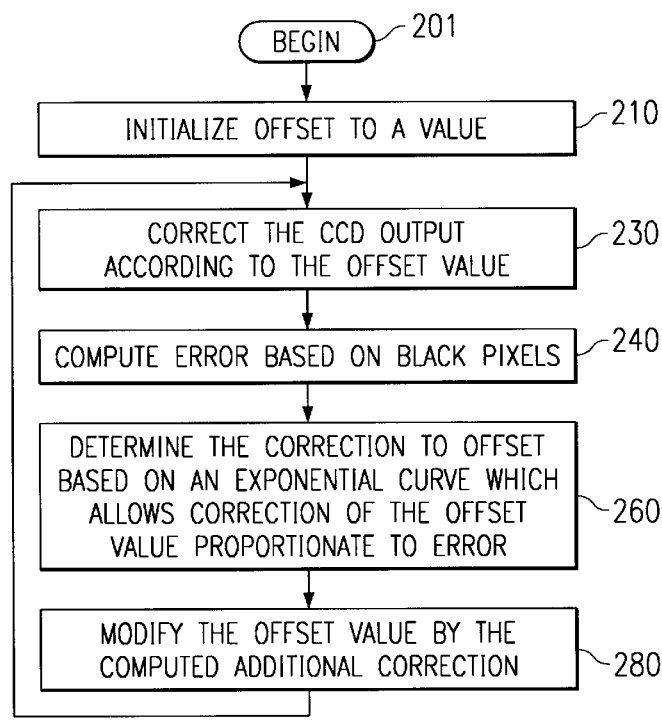
FIG. 2 is a flow chart illustrating a method in accordance with the present invention.

FIG. 2 is a flow chart illustrating a method for offset correction implemented in accordance with the present invention. The method is described with reference to components of device 190 of FIG. 1 for illustration only. The method begins in step 201, in which control immediately passes to step 210. In step 210, the offset to be applied to the output of CCD 130 is initialized to a value. The initialization may be either provided under external control or be pre-set.

In step 230, the output of CCD 130 is corrected according to the offset value. The resulting pixel elements are passed to post-processor 150. In step 240, AFE 140 computes an error in the offset based on the black pixels received from CCD 130. That is, the error is typically proportionate to the extent of difference of received black pixel values from value corresponding to no-light (black/dark) situation.

In step 260, the correction to be applied to the offset is determined by using an exponential curve which allows for greater degree of correction when the error is higher. In an embodiment described below, the curve is characterized by the maximum correction sought to be permitted, the desired minimum correction, and the rate at which the correction should approach the minimum value.

In step 280, the offset is modified according to the correction computed in step 260. Control then passes to step 230, in which the CCD output is corrected according to the corrected offset value. The loop of steps 230–280 can continue as dark pixels are received from CCD 130.

Due to the exponential nature of the curve, the correction is rapid when the error is large, yet the solution allows corrections of sufficiently small magnitude. The speed of convergence can be controlled by the appropriate design of the exponential curve. As described below with reference to an example embodiment of FIG. 3, AFE 140 can be implemented while minimizing power and space consumption.

4. Analog Front End

Figure 3:
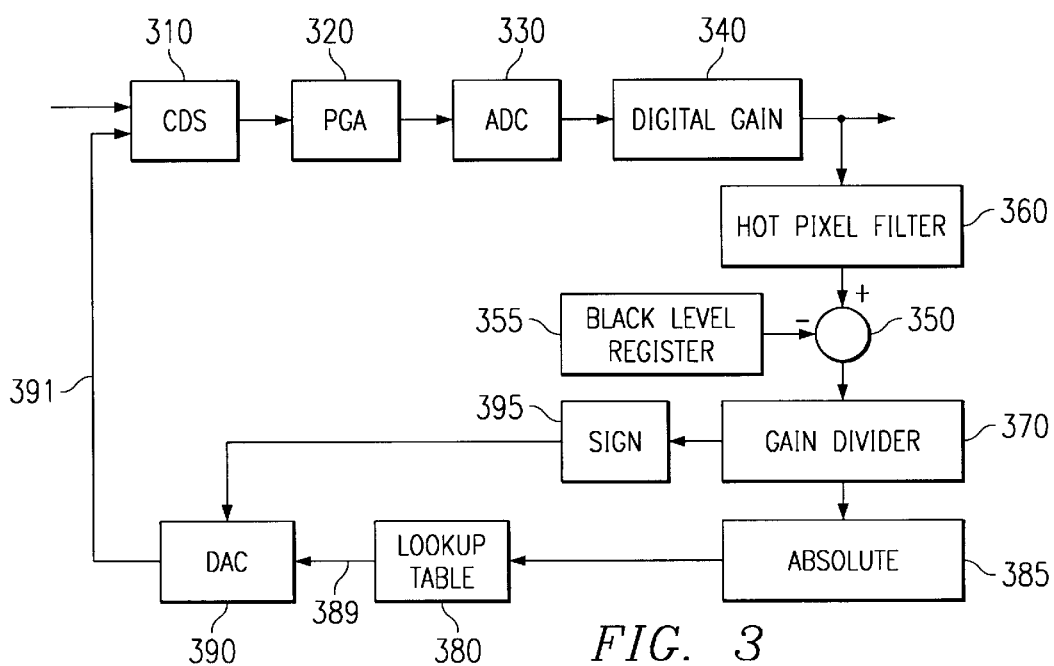
FIG. 3 is a block diagram illustrating the details of an embodiment of an analog front end provided in accordance with the present invention.

FIG. 3 is a block diagram of AFE 140 illustrating the details (in one embodiment) as relevant to an understanding of several aspects of the present invention. AFE 140 is shown containing correlated double sampler circuit (CDS) 310, programmable gain amplifier (PGA) 320, analog to digital converter (ADC) 330, digital gain 340, adder 350, black level register 355, hot pixel filter 360, gain divider 370, look-up table 380, and DAC 390. Each component is described below in further detail.

CDS 310 receives voltage inputs from CCD 130, and performs a correlated double sampling operation. In addition, CDS 310 performs offset correction by subtracting (in analog domain) the offset received from DAC 390 from each of the pixel analog values. The output of CDS 310 represents the error in offset when the analog signals corresponding to dark pixels are processed.

The voltage output of CCD 310 is amplified by PGA 320 by a gain specified typically by a designer depending on image 110. ADC 330 digitizes the amplified voltage signal to generate pixel digital elements. The pixel digital elements may again be amplified by digital gain 340. CDS 310, PGA 320, ADC 330, and digital gain 340 may be implemented in a known way.

Hot pixel filter 360 may ignore 'hot pixels' (which are stuck at a high value due to, for example, manufacturing defects). In an embodiment, a value corresponding to an adjacent pixel may be substituted for each hot pixel. Adder 350 subtracts the black level value stored in black level register 355 from each pixel digital element received from digital gain 340. As is well known in the relevant arts, a designer may wish to set black/dark level to a non-zero value, and the corresponding value is subtracted from each pixel digital value.

Gain divider 370 divides the output of adder 350 by the aggregate gain of PGA 320 and digital gain 340. By performing such division, the error value received by look-up table 380 may be made to be independent of any gain performed in digital gain 340 and PGA 320.

Look-up table 380 receives the absolute value of the error and causes DAC 390 to generate an offset value to effect any further offset corrections necessary in the processing of the image signal received from CCD 130. In an embodiment described below, DAC 390 keeps track of an offset applied for the previous line of an image, look-up table 380 provides an indication of the further correction to the offset, and DAC 390 generates the corrected offset analog signal.

Look-up table 380 and DAC 390 together form an example offset generation circuit implemented according to several aspects of the present invention. As noted above, CDS 310 performs offset correction based on the analog offset generated by DAC 390. The operation of example embodiments of look-up table 380 and DAC 390 will be clearer by first appreciating the manner in which the correction to offset is determined.

5. Determining Correction to Present Offset

As noted above, the correction to the present offset is determined based on an exponential curve. The manner in which the exponential curve can be designed and the manner in which correction values (to offset) for different error values can be computed is described now. For illustration, it is assumed that the design requirements are (1) maximum error (at CDS 310) for which the curve needs to be designed: 100 mV (milli-volts); (2) final desired error in the offset value (at the output of gain divider 360): 1/100th of an ADC's least significant bit (LSB); and (3) desired time in which the error should converge: 1000 pixels. The settled output error (least correction possible) is chosen as 1/100 of ADC 330's LSB to account for the fact that the input signal may be amplified up to 100 times (corresponding to a gain of 39.5 dB in PGA 320 and digital gain 340).

Figures 4, 5A, 5B, 5C, 5D:
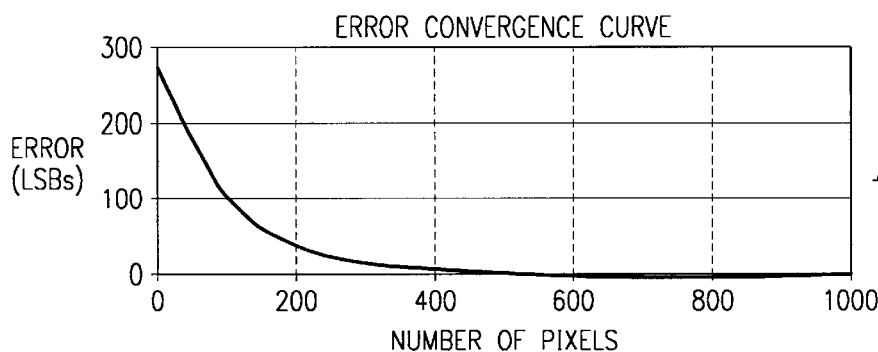
FIG. 4 is a graph of a curve ("convergence curve") illustrating an example goal at which errors in offset may need to be corrected.
FIG. 5A is a table containing the discrete data points on the convergence curve of FIG. 4.
FIG. 5B is a table depicting the slopes (which determines the correction step size) corresponding to the linear segments formed by adjacent data points of FIG. 5A.
FIG. 5C is a table showing a mapping of the digital correction step sizes of FIG. 5B to the analog voltage corrections to be applied to a CDS.
FIG. 5D is a table illustrating the manner in which the number of required analog voltage levels are optimized due to the minimum offset correction sought to be attained in the chosen example scenario.

The error convergence curve corresponding to the goals is depicted in FIG. 4. In one embodiment, the convergence is attained by determining the offset to correction to be equal to the slope of the curve a point at which the error maps to. To further expedite the computation of the slope, the curve may be conveniently viewed as a series of segments (either equal or unequal), and the slope of the segment may be used to determine the degree to which a present offset is to be corrected. The manner in which curve can be broken into a sequence of connected linear segments is described below.

Assuming ADC 330 is a 12 bit ADC with a peak voltage of 1.5V, each LSB of the ADC corresponds to a voltage of 375 $\mu$V (micro-volts), and 100 mV corresponds to 280 LSBs. The time constant ($\lambda$) of the exponential curve may be determined from the above design goals as follows:

$$V_{out} = V_{in} e^{-n/\lambda} \quad \text{Equation (1)}$$

wherein
$V_{in}$=initial input to the system;
$V_{out}$=output from the system at time instance n; and
$\lambda$=time constant of the exponential curve.

Substituting the design goals ($V_{out}$=1/100; $V_{in}$=280; and n=1000) of above, we have:

$$1/100 = 280\, e^{-1000/\lambda} \quad \text{Equation (2)}$$

From Equation (2), it follows that:

$$\lambda \equiv 90 \quad \text{Equation (3)}$$

wherein$\equiv$represents the relationship 'approximately equals'.

The output ($V_{out}$) after each 90 pixels may be given as shown in the table of FIG. 5A. To discretize the exponential curve, one may view the points of FIG. 5A as two ends of a linear segment, and the slope of the segments (using 90 pixels as a divisor/basis) may be computed. The corresponding results are shown in FIG. 5B.

According to an aspect of the present invention, the slope (in LSBs of ADC 330) represents the desired effective correction (i.e., after amplification at PGA 320 and digital gain 340). For example, effective corrections of 1.9469, 0.7162 and 0.0357 (ADC 330 LSBs) are desirable for error magnitudes of 150, 80, and 4 (ADC 330 LSBs). The corrections of FIG. 5B are also referred to as steps sizes since each number spans a range of numbers on Y-coordinates of FIG. 4.

The digital step sizes of FIG. 5B need to be converted into change in voltage level in the signals generated by DAC 390. Such a conversion generally requires an analysis of the manner in which the correction component of the offset signal is affected by different components in the path from the output of DAC 390 to the input of ADC 330. The goal is to correct the analog offset input to CDS 310 such that the correction would result in a correction equal to the step sizes of FIG. 5B at ADC 330.

In one embodiment in which ADC 330 is designed for peak voltage of 1.5 V for a 12-bit input, the conversion is given by the equation:

$$\Delta \text{Offset} = (1.5\, \text{Volts} \times \text{Digital Step Size})/1024 \quad \text{Equation (4)}$$

Wherein $\Delta$ Offset represents the correction to the analog offset provided as an input to CDS 210, and digital step size is shown in the second column of FIG. 5B.

FIG. 5C depicts the analog corrections to offset corresponding to the digital step sizes. It may be noted that the bottom six entries have corrections which are less than the minimum possible correction of 35 $\mu$Volts. Accordingly, the errors may be added for multiple pixels, and no correction may be performed until the error accumulates to 35 $\mu$Volts. Thus, the correction corresponding to the six entries is shown as 35 $\mu$Volts in FIG. 5D. The manner in which the corrections to offset may be attained is described below with examples.

6. Look-up Table and DAC Broadly

In one embodiment, look-up table 380 is designed to receive the absolute value of the error computed by gain divider 360, and generates a 3 digit input. Of the eight possible values, only six may be used. The six values respectively specify that further correction is as indicated in the six entries in the second column of FIG. 5D. DAC 390 may keep track of previous offset and add the correction indicated by the 3-digit input as described below.

Figure 6:
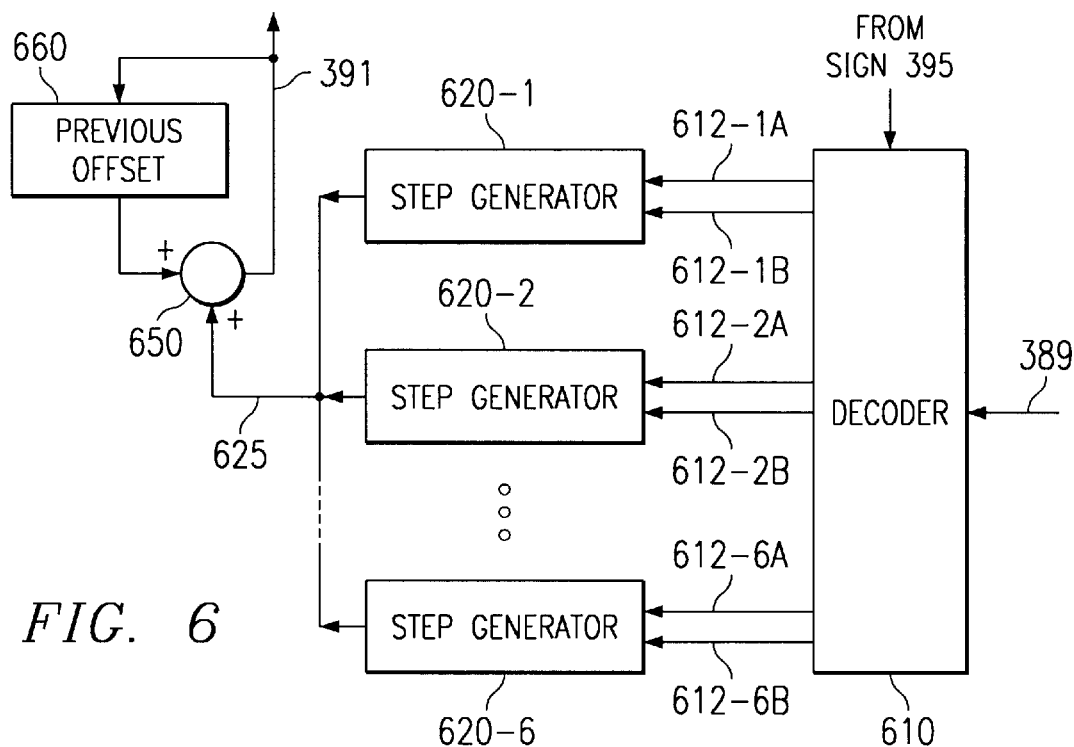
FIG. 6 is a block diagram of a DAC illustrating the details of an embodiment thereof.

FIG. 6 is a block diagram illustrating the details of DAC 390 in one embodiment. DAC 390 is shown containing decoder 610, step generators 620-1 through 620-6, adder 650, and previous offset 660. Each component is described below in further detail.

Previous offset 660 stores an offset value used with the previous dark pixel of the processed image. Adder 650 adds the value stored in previous offset 660 to the output generated by the selected step generators, and the resulting voltage level is stored in previous offset 660. The value represents the offset used for subsequently received pixel values.

Decoder 610 receives a 3-digit input and asserts one of the six outputs 612-1A through 612-6A. The corresponding step generator 620-1 through 620-6 generates the correction to offset in the form of a voltage signal. For each step generator, either the A or B input is enabled depending on whether a positive or negative sign is received from sign 395.

In response, the selected one of the step generators 620-1 through 620-6 generates a corresponding voltage level (on path 625) equaling one of the values indicated in the second column of FIG. 5D. The voltage has a polarity as determined by the sign received from sign 395. An example embodiment generating the corrected offset voltage (including step generators 620-1 through 620-6, adder 650, and previous offset 660) is described below. The principle underlying the embodiment is described first.

7. Principle Behind Generating Corrected Offset Voltage

Figure 7A:
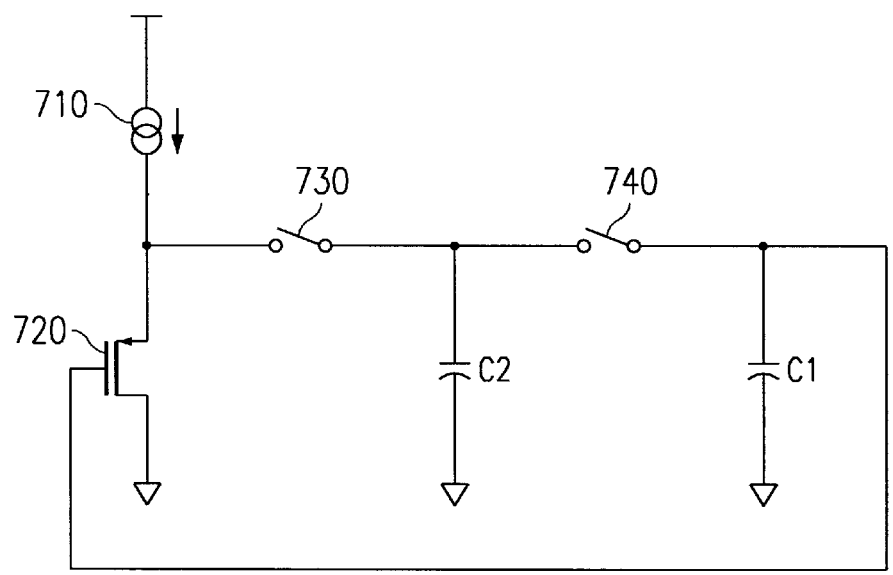
FIG. 7A is a block diagram of a step generator circuit and FIG. 7B a related timing diagram illustrating an embodiment for generating a correction to a previous offset.

FIG. 7A is a circuit diagram illustrating the principle underlying the generation of a corrected offset voltage. The circuit diagram is shown containing the source of MOSFET 720 being driven by constant current source 710. The gate of MOSFET 720 is shown connected to capacitor C1, and also to capacitor C2 by switch 740. The same end of capacitor C2 is also connected to the source of MOSFET 720 by switch 730. The second ends of capacitors C1 and C2, and the drain terminal of MOSFET 720 are grounded.

Figure 7B:
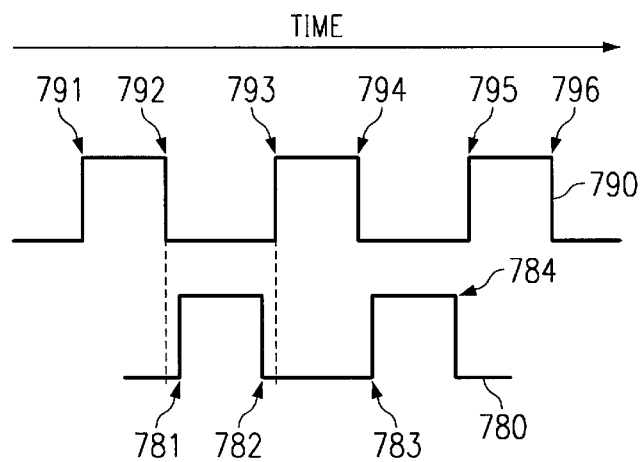

The switches 730 and 740 may be operated according to the clock signals shown in FIG. 7B. Switch 730 is closed (and 740 open) when signal 790 is at high logical level (e.g., between time points 791 and 792), with the result that capacitors C1 and C2 are respectively charged by voltage levels at the gate and source terminals of MOSFET 720.

Switch 740 is closed when signal 780 is at a high logical level (e.g., between time points 781 and 782). As may be appreciated the two capacitors C1 and C2 are shorted in the corresponding time durations. The effect of the switches being open and closed is analyzed according to the following equations.

Assume that two capacitors with capacitances C1 and C2 are respectively charged to voltages V1 and V1 in the time duration between 791 and 792. When the two capacitors are shorted between time duration 781 and 782, then the net charge (Qtotal) on them becomes:

$$\text{Qtotal} = C1V1 + C2V2 \quad \text{Equation (5)}$$

The final voltage on the connected capacitors equals:

$$V = (\text{Qtotal})/(C1 + C2) \quad \text{Equation (6)}$$

The voltage increment on capacitor C1 equals:

$$V-V1=\Delta V1=(V1-V1)/((1+(C1/C2))=V_{SG}/((1+(C1/C2))) \quad \text{Equation (7)}$$

wherein $V_{SG}$ represents the voltage across the source and gate terminals.

As is well known, the voltage $V_{SG}$ across the source and gate terminals is constant when the source terminal is driven by a constant current source (which may be implemented in a known way). Accordingly, the change in voltage level across capacitor C1 is determined only by the ratio of C1/C2.

According to an aspect of the present invention, C1 is shared by all the step generators 620-1 through 620-6, and the value of C2 is selected with different capacitances to achieve the desired step size (or correction voltage). In one embodiment, $V_{SG}$ equals 0.9 Volts, C1 equals 250 pF (pico farads), and C2 equals 10 fF (femto farads) to achieve a step of magnitude 35 $\mu$V. C2 can have values of 795 fF, 292 fF, 107 fF, 39 fF, and 15 fF corresponding to step sizes of 2852, 1049, 386, 142, and 52.3 $\mu$Vs shown in FIG. 5D. An embodiment implementing step generators 620-1 through 620-6 is described below in further detail.

8. Step Generators

Figure 8:
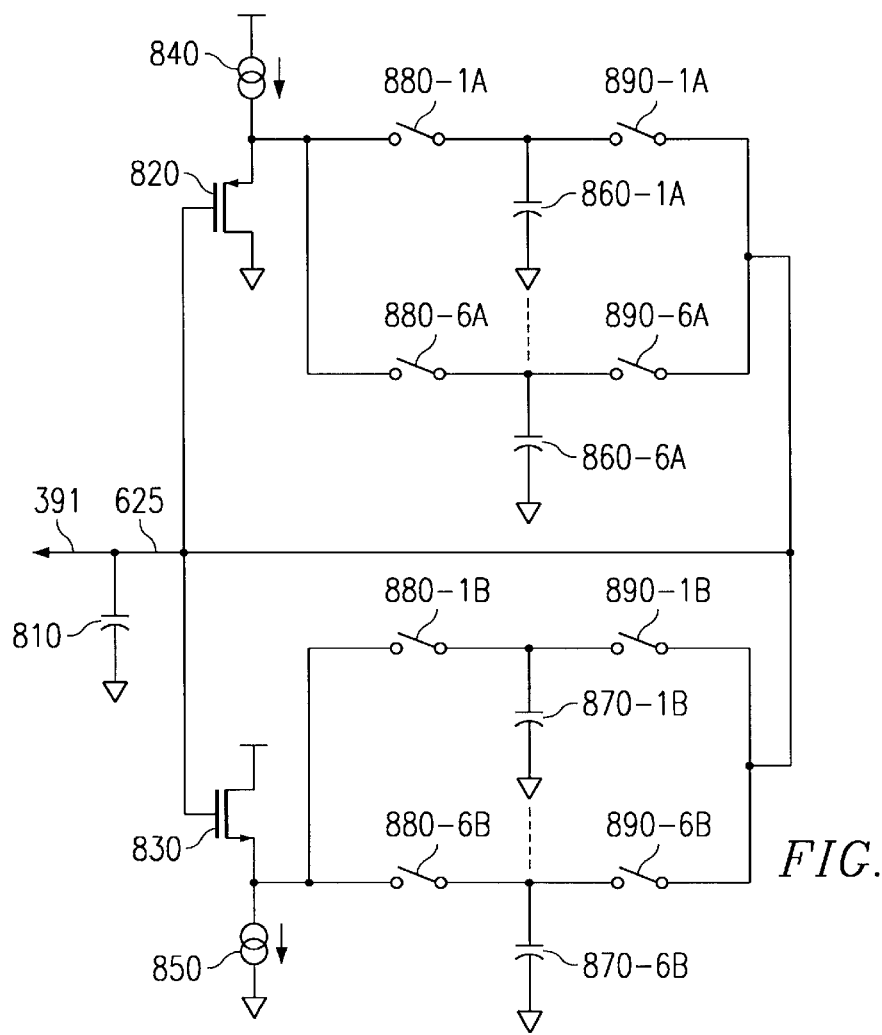
FIG. 8 is a circuit diagram illustrating an approach for efficiently generating a corrected offset in an integrated circuit.

FIG. 8 is a block diagram illustrating the manner in which step generators 620-1 through 620-6 are implemented in an embodiment of the present invention. The diagram is shown containing capacitor 810 (shared by all six step generators), PMOS transistor 820, NMOS transistor 830, constant current sources 840 and 850, and several components ending with A in one related block ("block A") and several other components ending with B in another related block ("block B"). All components of FIG. 8 are described below in further detail.

It may be noted that the components of block A can be identical to the components of block B. Block A is operated when correction sought to be attained is positive and block B is operated otherwise. Only the components of block A are described for conciseness. In addition, block A is shown containing six sets of components, with each set generating the voltage for a step. The sets differ in the capacitances of capacitors 860-1A through 860-6A, with each capacitor (as described above with reference to C2 in FIG. 7A) being designed to generate a corresponding step size.

Switches 880-1A and 890-1A are operated when line 612-1A is selected. Switches 880-1B and 890-1B are operated when line 612-B is selected. Switch 880-1A (and 880-1B) is operated similar to switch 730 of FIG. 7, and switch 890-1A (and 890-1B) is operated similar to switch 740. It should be noted that only one of the switches 880-1A through 880-6A and 8800-1B through 880-6B is closed corresponding to the cycles of signal 790 depending on the correction step size. Similarly, the corresponding one of the switches 890-1A through 890-6A and 890-1B through 890-6B is closed corresponding to the cycles of signal 780.

PMOS transistor 820 generates a positive voltage corresponding to any voltage block A may generate. NMOS transistor 830 generates a negative voltage corresponding to any voltage generated by block B. Only one of the two transistors is active depending on whether the correction sought is positive or negative.

As a result, the magnitude of change in voltage across capacitor 810 equals the change caused by one of the two active blocks, and the sign is determined by the which of the two blocks caused the change. As noted above, the change caused by the blocks may be controlled by controlling the capacitances of the capacitors 860-1A through 860-6A and 870-1B through 870-6B (each operated similar to capacitor C2 of FIG. 7A).

The voltage across capacitor 810 represents the corrected offset, and the offset is corrected iteratively until the error is less than or equal to the final desired error in the offset (one LSB of ADC 330 in the above example). In an embodiment, the charge in (or voltage across) capacitor 810 is drained to initialize the offset to zero. The voltage across capacitor 810 can be used to generate the offset driving CDS 310.

Thus, an aspect of the present invention provides for quick convergence to the accurate offset value as the correction is higher when the error is more. Another aspect of the present invention provides for an efficient implementation of generating the offset consistent the desired correction.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of capturing an image in a digital form, said method comprising:

allowing a light corresponding to said image to be incident on an image sensor, wherein said image sensor contains a plurality of pixels, said plurality of pixels further containing a plurality of black pixels and a plurality of active pixels, wherein each of said plurality of active pixels stores a charge proportionate to the intensity of incident light and the time of incidence of said light on the pixel, wherein said plurality of black pixels are designed not to be exposed to said light;

initializing an offset to an initial value;

receiving an output corresponding to each of said plurality of pixels;

correcting said output by said offset;

computing an error based on output corresponding to at least some of said plurality of black pixels;

determining a correction to said offset based on an exponential curve which provides a correction proportionate to said error; and modifying said offset by said determined correction, whereby said offset converges quickly to eliminate undesirable components in the output of said image sensor.

2. The method of claim 1, wherein said receiving, correcting, computing, determining and modifying are performed iteratively with new corrected values for said offset.

3. The method of claim 2, wherein said exponential curve is designed based on a maximum error sought to be corrected, the minimum error sought to be achieved, and the rate at which the maximum error should approach the minimum error.

4. The method of claim 3, wherein said exponential curve is logically viewed as a sequence of linear segments with different values of error on one axis of a graph defining said exponential curve, said determining comprises:

mapping said error to one of said linear segments; and setting said correction to be equal to a slope of said one of said linear segments.

5. The method of claim 4, wherein said image sensor comprises a charge coupled device (CCD).

6. A device capturing an image in a digital form, said device comprising:

capturing means containing a plurality of pixels, said plurality of pixels containing a plurality of black pixels and a plurality of active pixels, said plurality of active pixels being exposed to light representing said image, wherein said plurality of black pixels are not exposed to said light, each of said plurality of active pixels storing a signal representative of incident light;

means for initializing an offset to an initial value;

means receiving an output corresponding to each of said plurality of pixels;

means for correcting said output by said offset;

means for computing an error based on output corresponding to at least some of said plurality of black pixels;

means for determining a correction to said offset based on an exponential curve which provides a greater degree of correction for higher values of said error; and means for modifying said offset by said determined correction, whereby said offset converges quickly to eliminate undesirable components in the output of said capturing means.

7. The device of claim 6, wherein said exponential curve is designed based on a maximum error sought to be corrected, the minimum error sought to be achieved and the rate at which the maximum error should approach the minimum error.

8. The device of claim 7, wherein said exponential curve is logically viewed as a sequence of linear segments with different values of error on one axis of a graph defining said exponential curve, said means for determining comprises:

means for mapping said error to one of said linear segments; and means for setting said correction to be equal to a slope of said one of said linear segments.

9. An analog front end (AFE) processing the output of an image sensor, wherein said image sensor contains a plurality of pixels, said plurality of pixels further containing a plurality of black pixels and a plurality of active pixels, wherein each of said plurality of active pixels stores a charge proportionate to the intensity of incident light and the time of incidence of said light on the pixel, wherein said plurality of black pixels are designed not to be exposed to said light, said AFE comprising:

a sampler receiving the charge stored in said plurality of pixels and generating a voltage level corresponding to each charge, said voltage level being generated after correction according to a previous offset;

a programmable gain amplifier (PGA) amplifying said voltage level to generate an amplified voltage level;

an analog to digital converter (ADC) converting said amplified voltage level to a digital value;

an error determination circuit generating an error value by examining said digital values corresponding to said black pixels; and an offset generation circuit correcting said previous offset according to an exponential curve which allows for correction proportionate to said error, said offset generation circuit generating a corrected offset value and providing said corrected offset value as said previous offset, whereby said error value converges quickly to a desired minimum error sought to be achieved due to said correction according to said exponential curve.

10. The AFE of claim 9, wherein said sampler comprises a correlated double sampler.

11. The AFE of claim 9, wherein said exponential curve is designed based on a maximum error sought to be corrected, the desired minimum error and the rate at which the maximum error should approach the minimum error.

12. The AFE of claim 9, wherein said exponential curve is logically viewed as a sequence of linear segments with different values of error on one axis of a graph defining said exponential curve, said offset generation circuit comprises:

a look-up table to map said error to one of said linear segments; and a digital to analog converter (DAC) generating said correction to be equal to a slope of said one of said linear segments.

13. The AFE of claim 12, wherein said DAC comprises:

a plurality of step generators, with each step generator being designed to generate a correction equal to a slope of a corresponding one of said linear segments;

a previous offset register storing said previous offset; and adder adding said correction generated by one of said plurality of step generators to said previous offset, and storing the result in said previous offset register, wherein said offset register is coupled to said sampler to provide said previous offset.

14. The AFE of claim 12, wherein said DAC comprises:

a first capacitor;

a second capacitor;

a first transistor having a source terminal, a gate terminal and a drain terminal, said source terminal being connected to a constant current source, said source terminal being connected to said second capacitor by a first switch, said gate terminal being connected to said first capacitor, said first capacitor and said gate terminal further being connected to said second capacitor by a second switch, wherein said first switch is closed and said second switch is open to cause said second capacitor to be charged by a source voltage and said first capacitor to be charged by a gate voltage, wherein said first switch is opened and said second switch is closed to short said first and second capacitors, whereby the change in voltage across said first capacitor is given by the equation: $V_{SG}/((1+(C1/C2))$, wherein $V_{SG}$ represents the voltage across said source and gate terminals, and C1 and C2 respectively represent the capacitances of said first and second capacitors.

15. The AFE of claim 14, wherein said DAC comprises a first block containing a plurality of sets corresponding to said linear segments, each set containing said second capacitor, said first and second switches, wherein said first capacitor is shared by all of said sets, wherein the capacitance corresponding to said second capacitor in each set is chosen to correspond to the slope of the corresponding linear segment, the first and second switches are closed only if correction/slope corresponding to the set is desired to be generated.

16. The AFE of claim 15, wherein said first transistor comprises an PMOS transistor, said AFE further comprising:

a NMOS transistor also having a source terminal, a gate terminal and a drain terminal, said source terminal of said NMOS transistor being connected to another constant current source, and said gate terminal of said NMOS transistor being connected to said first transistor;

a second block having identical components as said first block, said second block being coupled to the source terminal of said NMOS transistor, wherein said NMOS transistor is designed to provide a correction of one polarity and said PMOS transistor provides said correction of another polarity, wherein the voltage level of said first capacitor is modified by said correction provided by either said NMOS transistor or said PMOS transistor.

17. A correction circuit for generating a correction to an offset based on an error determined by the examination of the output related to a plurality of black pixels of a charge coupled device (CCD), said offset being used to correct the output of said CCD, said correction circuit comprising:

a first capacitor;

a first transistor having a source terminal, a gate terminal and a drain terminal, said source terminal being connected to a constant current source, said gate terminal being connected to said first capacitor;

a first block containing a plurality of sets, each of said plurality of sets comprising a second capacitor, said source terminal being connected to said second capacitor by a first switch, said first capacitor and said gate terminal further being connected to said second capacitor by a second switch, wherein said first switch is closed and said second switch is open to cause said second capacitor to be charged by a source voltage and said first capacitor to be charged by a gate voltage, wherein said first switch is opened and said second switch is closed to short said first and second capacitors, whereby the change in voltage across said first capacitor is given by: $V_{SG}/((1+(C1/C2))$, wherein $V_{SG}$ represents the voltage across said source and gate terminals, and C1 and C2 respectively represent the capacitances of said first and second capacitors, wherein the capacitance of each of said second capacitors is chosen to enable different set to provide different changes, and the first and second switches corresponding to all the sets except a set designed to provide the desired change are maintained in an open position such that said desired change is attained on said first capacitor.

18. The correction circuit of claim 17, wherein said first transistor comprises a NMOS transistor, said correction circuit further comprises:

a PMOS transistor having a source terminal, a gate terminal and a drain terminal, said source terminal of said PMOS transistor also being connected to another constant current source, said gate terminal of said PMOS transistor being connected to said first capacitor; and a second block having identical components as said first block, wherein the first and second switches of only one of the sets in both said first and second blocks is operated to be in a closed position such that the voltage level on said first capacitor is changed by one polarity if the operated set is in said first block an by another polarity if the operated set is in said second block.

* * * * *